US012189647B2

(12) United States Patent
Chen et al.

(10) Patent No.: US 12,189,647 B2
(45) Date of Patent: Jan. 7, 2025

(54) ADAPTIVE DISTRIBUTED GRAPH QUERY PROCESSING FOR OLTP AND OLAP WORKLOAD

(71) Applicant: TigerGraph, Inc., Redwood City, CA (US)

(72) Inventors: Songting Chen, Portola Valley, CA (US); Jin Yan, Seattle, WA (US); Yuanshu Yun, Seattle, WA (US)

(73) Assignee: TigerGraph, Inc., Redwood City, CA (US)

( * ) Notice: Subject to any disclaimer, the term of this patent is extended or adjusted under 35 U.S.C. 154(b) by 0 days.

(21) Appl. No.: 18/060,254

(22) Filed: Nov. 30, 2022

(65) Prior Publication Data

US 2024/0176792 A1 May 30, 2024

(51) Int. Cl.
*G06F 16/245* (2019.01)
*G06F 16/25* (2019.01)
*G06F 16/28* (2019.01)

(52) U.S. Cl.
CPC .......... *G06F 16/254* (2019.01); *G06F 16/245* (2019.01); *G06F 16/283* (2019.01)

(58) Field of Classification Search
CPC ..... G06F 16/245; G06F 16/254; G06F 16/283
See application file for complete search history.

(56) References Cited

U.S. PATENT DOCUMENTS 11,016,969 B1 * 5/2021 Chen ................. G06F 16/24528
11,500,931 B1 * 11/2022 Parchas ............... G06F 16/9024
11,501,202 B1 * 11/2022 Stefani ................ G06F 16/9038
11,620,289 B1 * 4/2023 Jiang ........................ G06F 16/27 707/718
12,001,433 B2 * 6/2024 Plattner ................. G06F 16/283
(Continued)

FOREIGN PATENT DOCUMENTS

CN 102906743 B * 10/2016 ............. G06F 16/28
CN 114357039 A * 4/2022

OTHER PUBLICATIONS

Malewicz et al., "Pregel: A System for Large-Scale Graph Processing", {malewicz,austern,ajcbik,dehnert,ilan,naty,qczaj}@google.com, SIGMOD'10, Jun. 6-11, 2010, Indianapolis, Indiana, USA, 2010, 11 pages.
(Continued)

*Primary Examiner* — Tarek Chbouki
(74) *Attorney, Agent, or Firm* — Jonathan M. Waldman

(57) ABSTRACT

Query processing using online transactional processing (OLTP) and/or online analytical processing (OLAP) use a distributed graph. Optimizations are described including compute pushdown OLTP mode, single thread OLTP mode, and automatic transition between OLTP mode and OLAP mode. A query processing engine comprises an OLTP processing engine, an OLAP processing engine, and a storage (e.g., a computer memory or storage). The OLTP processing engine is configured to process OLTP queries, and the OLAP processing engine is configured to process OLAP queries. The query processing engine may comprise a transition determination engine configured to determine when to transition query processing between OLTP query processing mode and OLAP query processing mode.

19 Claims, 12 Drawing Sheets

1100

(56) References Cited

U.S. PATENT DOCUMENTS

| | | | | |
|---|---|---|---|---|
| 2018/0315141 | A1* | 11/2018 | Hunn | G06F 9/547 |
| 2019/0384852 | A1* | 12/2019 | Pinno | G06F 16/9535 |
| 2020/0042712 | A1* | 2/2020 | Foo | G06F 21/577 |
| 2020/0349172 | A1* | 11/2020 | Constandache | G06F 16/275 |
| 2022/0197911 | A1* | 6/2022 | Freedman | G06F 16/248 |
| 2023/0045347 | A1* | 2/2023 | Grady | G06N 5/02 |
| 2023/0063730 | A1* | 3/2023 | Chen | G06F 16/283 |

OTHER PUBLICATIONS

Chen, Heng, NebulaGraph, "An Introduction to NebulaGraph's Storage Engine", Dec. 26, 2019, https://static.googleusercontent.com/media/research.google.com/en//pubs/archive/36632.pdf, 8 pages.

Melnik, Sergey et al., "Dremel: Interactive Analysis of Web-Scale Datasets", fmelnik,andrey,jlong,gromer,shiva,mtolton,theovg@google.com, Proceedings of the VLDB Endowment, vol. 3, Issue 1-2, Sep. 2010, 10 pages.

Stonebraker, Michael et al., The End of an Architectural Era (It's Time for a Complete Rewrite), VLBD '07, Sep. 23-28, 2007, Vienna, Austria, Copyright 2007, VLDB Endowment, ACM 978-1-59593-649-Mar. 7, 2009, 10 pages.

* cited by examiner

200

400

800

900

ADAPTIVE DISTRIBUTED GRAPH QUERY PROCESSING FOR OLTP AND OLAP WORKLOAD

BACKGROUND

Graphs represent relationships between entities. A graph database comprises vertices (also referred to as nodes), edges, and properties (also referred to as attributes). Vertices represent data, edges represent relationships between vertices, and properties are information regarding the vertices. Graphs are often huge, with millions or billions of edges. The data structure of such huge graphs is typically partitioned across many servers and stored distributively.

Two types of query processing that use graphs are online transactional processing (OLTP) and online analytical processing (OLAP). OLTP is optimized for executing online database transactions such as with respect to low complexity queries and user requests, often in real-time. OLAP is optimized for conducting complex data analysis such as with respect to business intelligence and historical processing. Distributed graphs pose challenges to efficient query processing for OLTP and OLAP.

It is with respect to these and other considerations that the various aspects and embodiments of the present disclosure are presented.

SUMMARY

Systems and methods are provided that perform OLTP query processing and/or OLAP query processing using a distributed graph. Optimizations are described including compute pushdown OLTP mode, single thread OLTP mode, and automatic transition between OLTP mode and OLAP mode.

In an embodiment, a method comprises: sending a request to a first server from a compute node for data to respond to a query; receiving the data at the compute node from the first server, wherein the data comprises first data stored at the first server and second data stored at a second server; analyzing the data at the compute node to generate a query response to the query; and outputting the query response.

In an embodiment, a method comprises: sending a request to a first server from a coordinator for a response to a query received at the coordinator; receiving the response at the coordinator from the first server, wherein the response is based on first data stored at the first server and second data stored at a second server; analyzing the response at the compute node to generate a query response to the query; and outputting the query response.

In an embodiment, a system comprises: a query processing engine configured to perform online transactional processing (OLTP) and online analytical processing (OLAP) on a query; and a transition determination engine configured to determine when to use OLTP processing on the query and when to use OLAP processing on the query.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
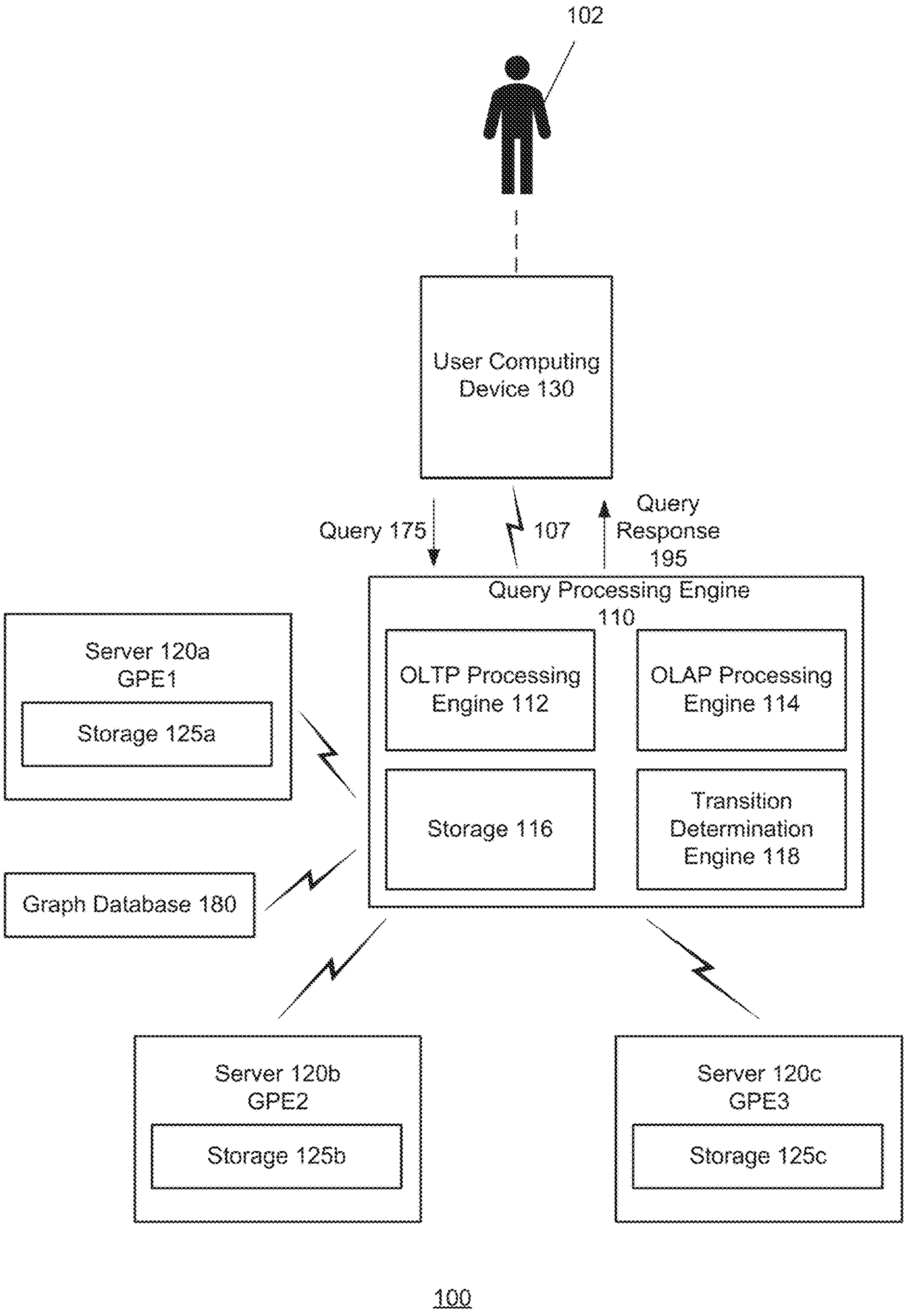
FIG. 1 is an illustration of an exemplary environment for adaptive distributed graph query processing for OLTP and OLAP workload.

FIG. 1 is an illustration of an exemplary environment 100 for adaptive distributed graph query processing for OLTP and OLAP workload. The environment 100 may include a query processing engine 110, a plurality of servers 120*a*, 120*b*, 120*c* (also referred to herein as servers 120), and a user computing device 130. A user (e.g., a developer, an administrator, another computing device, etc.) 102 may interact with the user computing device 130. The user computing device may provide a query 175 to the query processing engine 110, and the query processing engine 110 may return a query response 195 to the user computing device 130.

In some implementations, the query processing engine 110, the servers 120, and the user computing device 130 may be in communication with one another through a network 107. The network 107 may be a variety of network types including, but not limited to, the public switched telephone network (PSTN), a cellular telephone network, and a packet switched network (e.g., the Internet). In some implementations, the query processing engine 110, the servers 120, and the user computing device 130 may be in communication with one another variously through more than one network or network type. Although only one query processing engine 110, three servers 120, and one user computing device 130 are shown in FIG. 1, there is no limit to the number of query processing engines, servers, and user computing devices that may be supported.

Figure 12:
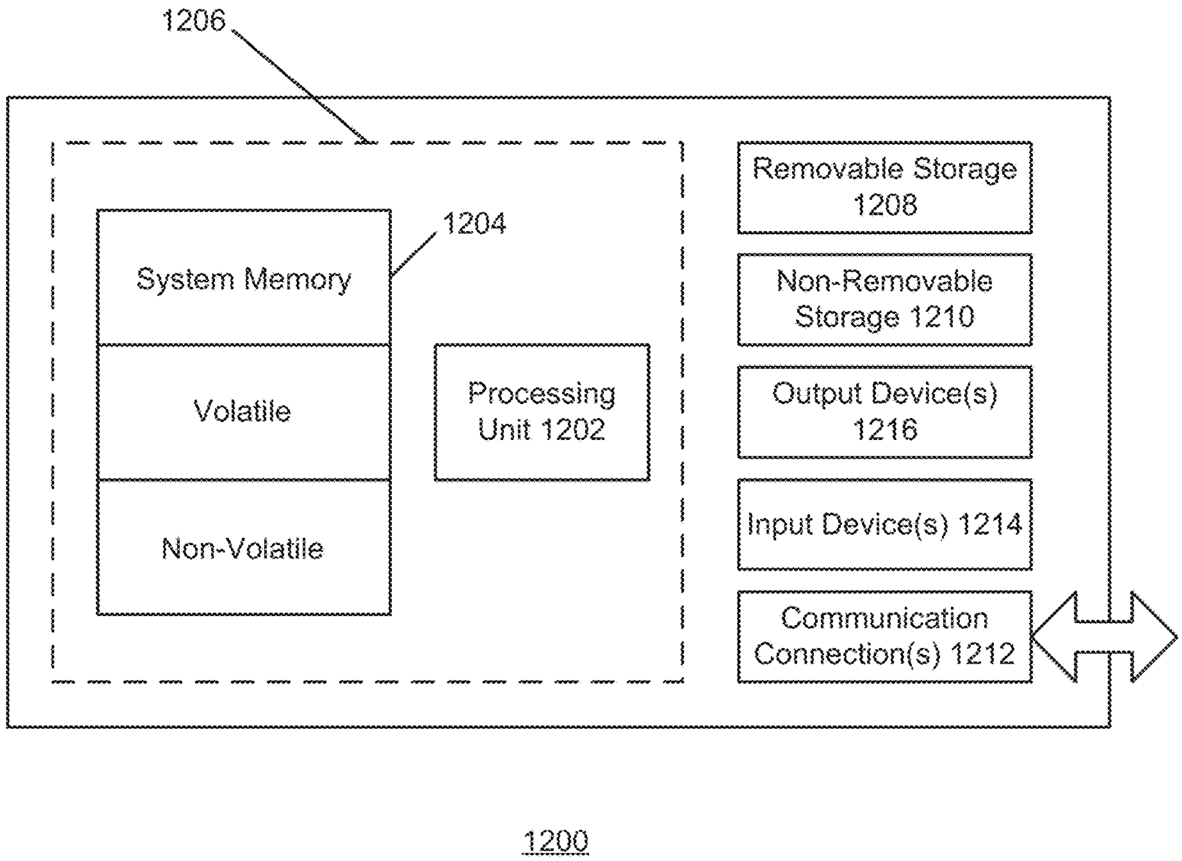
FIG. 12 shows an exemplary computing environment in which example embodiments and aspects may be implemented.

The query processing engine 110, the servers 120, and the user computing device 130 may each be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 12 as the computing device 1200. As shown, each server 120*a*, 120*b*, 120*c* respectively comprises storage 125*a*, 125*b*, 125*c*, e.g., each comprising a computer memory or storage (also referred to herein as storage 125). In some implementations, the query processing engine 110 may reside on, or be integral to, one of the servers 120, and they may be in communication with each other without a network connection.

The query processing engine 110 comprises an OLTP processing engine 112, an OLAP processing engine 114, and a storage 116 (e.g., a computer memory or storage). The OLTP processing engine 112 is configured to process OLTP queries as further described herein, and the OLAP processing engine 114 is configured to process OLAP queries as further described herein. In some implementations, the query processing engine 110 further comprises a transition determination engine 118 configured to determine when to transition query processing between OLTP and OLAP modes as further described herein.

A graph database 180 is stored distributively among the servers 120, such that data of the graph database is partitioned (i.e., distributed) among the storage 125 of the servers 120. More particularly, each of the storages 125*a*, 125*b*, 125*c* may store some data of a graph database 180. The graph database 180 is a distributed graph with its data spread among the storage of multiple servers. Depending on the implementation, OLTP processing and/or OLAP processing may be performed on the graph database 180 in response to the query 175 being received at the query processing engine 110 (e.g., from the user computing device 130).

An example query is provided and is used to help further describe aspects and features of embodiments and implementations herein:

```
create query test1(Set<Vertex<Person>> users) for graph ldbc_snb{
  GroupByAccum<INT, SumAccum<INT>> @@age_count;
  AvgAccum<INT> @avg_comment_len;
  Start = {users};
  Result = select t
    from Start:s - (Creates) - Comment:t
    where t.creationDate == 1997
    accum s.@avg_comment_len += t.len, @@age_count +=
    (s.age -> 1)
}
```

The query starts (Start) from the user nodes (users) in the distributed graph then traverses edges (Creates) and find its user comments (Comments) between nodes. In the traversal of the graph, there is an edge between each user and the corresponding user comment. When a user creates a comment, then there is an edge (or link) between the two nodes (the user node and the user comment node). There is a filter in this query to make sure the comment is created in 1997 (this "creationDate" is the attribute). An accumulator (accum) does some computation along the traversal. For example, local accumulator (@avg_comment_len) is computed per vertex, where the average comment length is computed per person. Global accumulator (@@age_count) is computed independent of the vertex, e.g., compute number of comments by each age group.

The graph is a distributed graph in the sense that all the users and comments and creates (in the example) cannot be stored as addresses in the same server, and so therefore they are partitioned among the various servers (e.g., servers 120*a*, 120*b*, 120*c*). Thus, some of the user data are stored in the server 120*a* GPE1 (graph processing engine 1), and some in the server 120*b* GPE2, and some in the server 120*c* GPE3, etc. The nodes (the users) are partitioned randomly across the GPEs (i.e., across the servers).

To answer the query 175, all of the servers 120 are involved because the data is stored spread among the servers 120. For example, in which all of the outgoing addresses are stored with server GPE1 (the source node or the source vertex), if the user has ten comments, all ten addresses are stored in server GPE1. So the traversal can be quickly performed from server GPE1. Note that however, the target nodes' (e.g., Comment) attributes are partitioned across all servers 120.

Figure 2:
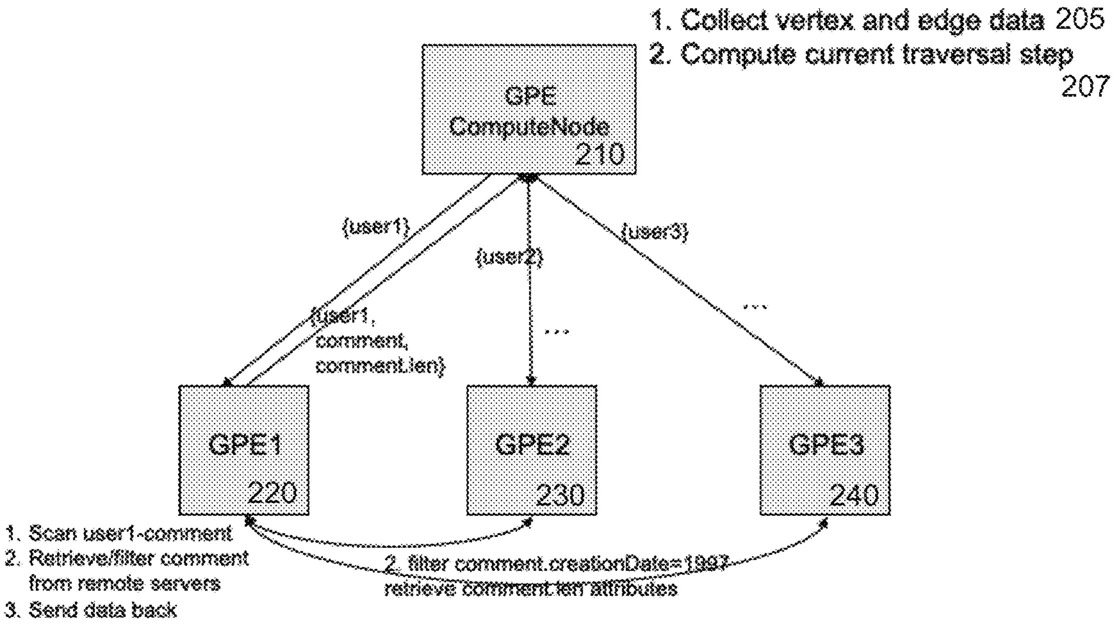
FIG. 2 is a diagram of a system useful for describing an implementation of query processing in an OLTP mode.

FIG. 2 is a diagram of a system 200 useful for describing an implementation of query processing in an OLTP mode. The system 200 comprises a plurality of servers 220, 230, 240 (GPE1 220, GPE2 230, GPE3 respectively) and a compute node 210 (GPE ComputeNode). In some implementations, the compute node 210 is resident or integral with one of the plurality of servers 220, 230, 240. The system 200 illustrates the compute node 210 separate from the servers 220, 230, 240 for ease of description, though it is contemplated that the compute node 210 may be comprised within one of the servers 220, 230, 240. As an example, the servers 220, 230, 240 may correspond to the servers 120*a*, 120*b*, 120*c*, respectively, of FIG. 1, and the compute node 210 may correspond to the OLTP processing engine 112 of the query processing engine 110 of FIG. 1, in some implementations. The compute node 210 is configured to pull and receive data from the servers 220, 230, 240 (i.e., collect vertex (node) and edge data 205) and perform the computation (e.g., including compute current traversal step 207) used to answer and respond to the query (e.g., the query 175).

For example, a query (e.g., the query 175) is received and to answer the query in the OLTP mode, a GPE compute node (e.g., the compute node 210) pulls data from other servers (e.g., the servers 220, 230, 240). In OLTP mode, the computation is performed on the GPE compute node. It is noted that the GPE compute node can be any of the GPE nodes (any of the servers in the cluster). So the GPE compute node gathers data from the other GPE servers. In the distributed graph, users may be distributed among the various servers.

The query is also looking for user addresses and user comments, so the addresses need to be sent to the GPE compute node also. Recall in the example, there is a filter on the comment (the date must equal 1997). E.g., GPE1 has outgoing comments to the GPE compute node, but the comment data are also in the graph as nodes, and the comments are also spread over the various multiple GPE servers. The GPE1 only points to the comment (the comment ID (the comment node) is stored on GPE3) but does not know the attribute (the creation date, whether it equals 1997 or not). When data is pulled over to the GPE compute node (e.g., GPE compute node requests to receive all the users which is local to GPE1, but GPE1 does not have the comment attribute information, so GPE1 will look up on corresponding server (e.g., GPE3) that has that particular comment node and ask them for the attribute information (e.g., does your comment satisfy the create date=1997?)). GPE3 will return back to GPE1 whether it satisfies 1997, and then GPE1 will only send those users back to the GPE compute node that satisfies 1997. To summarize, the GPE compute node will try to get data from other servers, but those servers only have the source node, and the address, but they do not have the target node information and then they need to communicate with other servers to get the target filtering condition. This way (by applying filters on the source nodes and on the target nodes) the amount of data being sent (transferred) back to the GPE compute node is minimized. Therefore, one server (e.g., the compute node) does all the computation, and the filtering is pushed down to the other servers to reduce the data that is sent back to the computation node. Also, the communication is in batch mode, i.e., retrieving multiple vertices at a time, instead of one by one. In some implementations, the address is traversed twice. For the first step, look at the distinct comments on GPE1 and perform any local filtering; then send the distinct comments from GPE1 to the server that holds that data (e.g., GPE2 and/or GPE3) and then on those servers, the comments will be retrieved that satisfy the conditions and then the results are sent back to GPE1.

Figure 3:
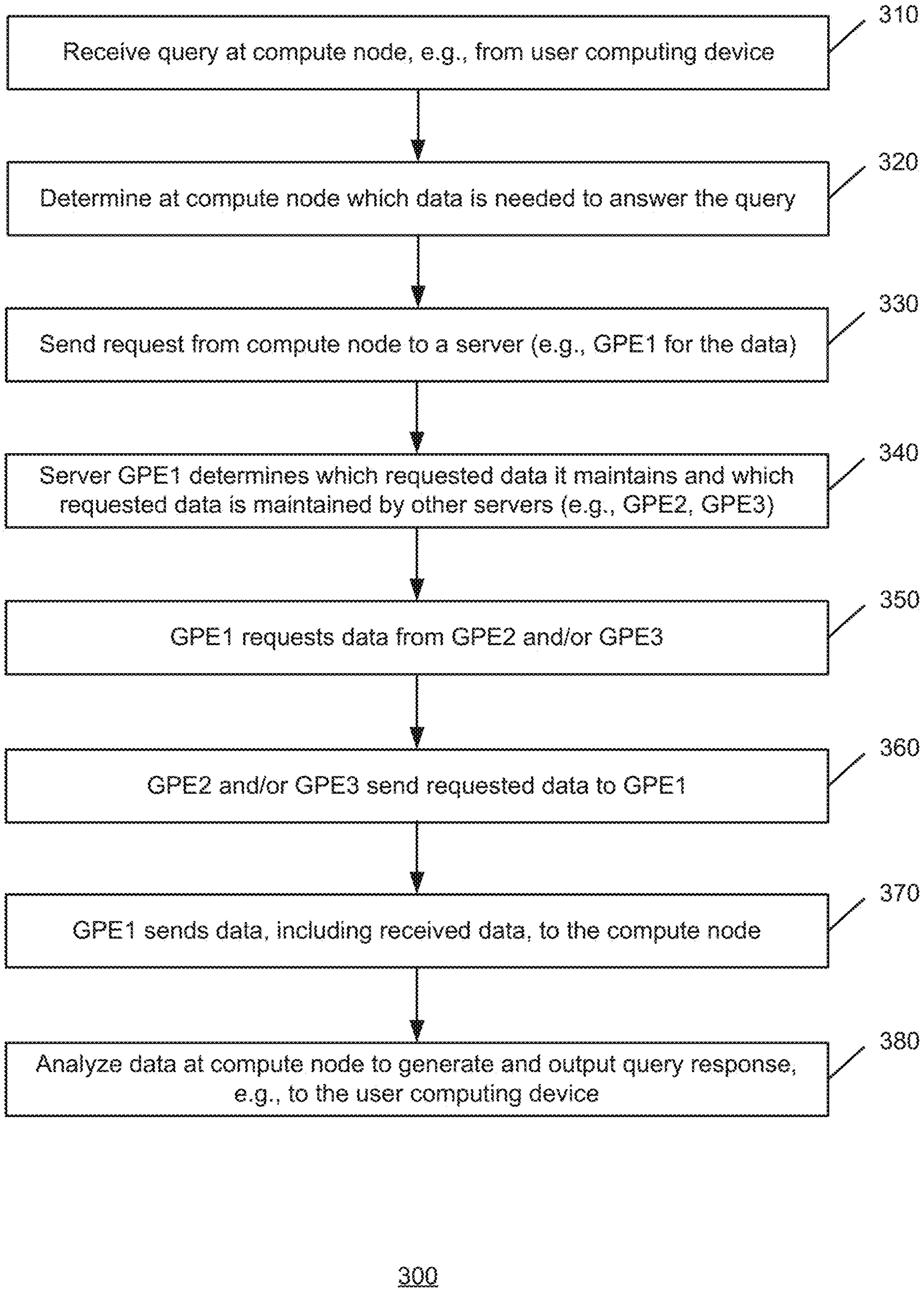
FIG. 3 is an operational flow of an implementation of a method for query processing in an OLTP mode.

FIG. 3 is an operational flow of an implementation of a method 300 for query processing in an OLTP mode. The method 300 may be performed in the environment 100 and/or by the system 200 in some implementations.

At 310, a query (e.g., the query 175) is received at the compute node 210 (e.g., the query processing engine 110). The query may be received from a user computing device, such as the user computing device 130.

At 320, based on the received query 175, the compute node 210 determines which data is needed to answer the query 175.

At 330, the compute node 210 sends a request to one of the servers (e.g., GPE1 server 220) for the data.

At 340, the server 220 determines which of the data it has in its storage, and which of the data is maintained by the other servers 230, 240.

At 350, the server 220 requests the data from the other servers 230, 240 that is maintained by the other servers 230, 240.

At 360, the other servers 230, 240 send the requested data to the server 220.

At 370, the server 220 sends the gathered data to the compute node 210 for computation of the response to the query 175.

At 380, the compute node 210 analyzes the data received from the server 220 and generates and outputs a response to the query (e.g., the query response 195). The query response 195 may be provided to a user computing device, such as the user computing device 130.

As noted above, data is stored distributed among the GPEs. The compute node asks all relevant GPEs for related edge and vertex data based on input vertices. The GPE compute node is one of the GPE servers in the cluster (e.g., GPE1, GPE2, etc.). It pulls the data from the other servers (the other GPEs). As an additional optimization, the participating GPE server (e.g., GPE1) may fetch/filter target vertex's attributes from other GPE servers. Otherwise, GPE1 will have to send (user1, comment) to the compute node first. Then the compute node will fetch the attributes/filtering on the Comment vertex from other servers. GPE1 asks the other GPE2 and GPE3 because some of the date comments for comments on GPE1 are stored in GPE2 and GPE3.

Figure 4:
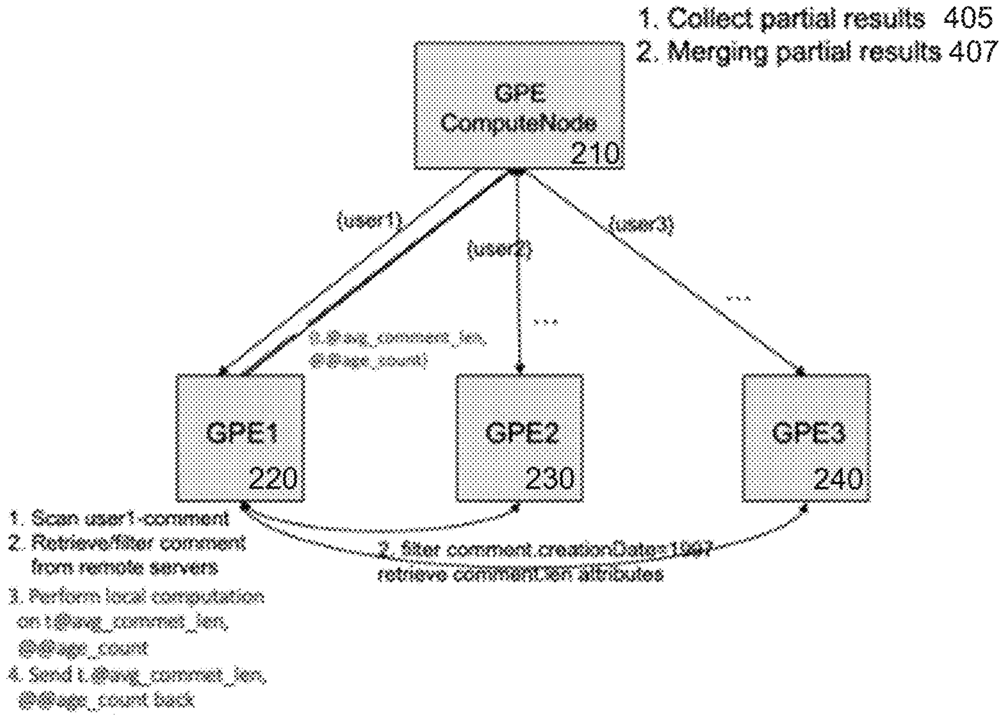
FIG. 4 is a diagram of a system useful for describing an implementation of query processing in a compute pushdown OLTP mode.

FIG. 4 is a diagram of a system 400 useful for describing an implementation of query processing in a compute pushdown OLTP mode. The system 400 is similar to the system 200 of FIG. 2 as it comprises a plurality of servers 220, 230, 240 (GPE1 220, GPE2 230, GPE3 240, respectively) and a compute node 210 (GPE ComputeNode). These components are similarly numbered to those in the system 200 of FIG. 2 and their descriptions are omitted for brevity. The compute pushdown OLTP mode is an optimization in which some of the computation that would otherwise be performed by the compute node 210 is performed by one of the servers 220, 230, 240 (i.e., pushed down to one of the servers).

For example, the GPE compute node 210 pushes down some of the computation it would otherwise perform to GPE1 (e.g., computation directed to computing a total, or a sum, or an average number of counts, etc.). The computation is done locally to GPE1 and the result is sent back to the GPE compute node. In this manner, not just raw data is sent back to the GPE compute node, but instead some computed results are also sent back to the GPE compute node from GPE1. Therefore, the amount of data sent back to the GPE compute node is decreased. The GPE compute node 210 thus collects partial results 405 and can merge the partial results 407 for use in the query result determination.

In some implementations, some computation is pushed down to GPE1 as well for local and global accumulators. In the above example, each server 220, 230, 240 traverses the edges and computes @avg_comment_len and @@age_count sends back to the compute node 210 where the final combination is done (the merging of partial results 407). This way less data may be sent back.

Because only the compute node 210 stores the final accumulator results, if the query needs to read these accumulators in the following steps after the query portion of the example query (not shown in the above example code, but is shown below), this mode may not be efficient. A query optimizer will decide which mode to use for a given query.

For example:

```
  SELECT s FROM s - (:e) - :t WHERE s.@count += 1, @@group +=
  (s.age, 1);
  // OK, do it in Compute-node;
  Case 1: select r FROM s ACCUM print s.@count;
  // OK, send both {s} and {s.@count} from Compute-node to GPE
  node that
holds {s};
  Case 2: select r FROM s - (:e) - :t ACCUM s.@s1 += s.@count *
  s.attr1;
  // No. Compute pushdown is not preferred since Compute node
  needs to send
full accumulator results @@group back to each GPE node;
  Case 3: select r FROM s - (:e) - :t ACCUM s.@s1 +=
  @@group.get(s.age); .
```

Figure 5:
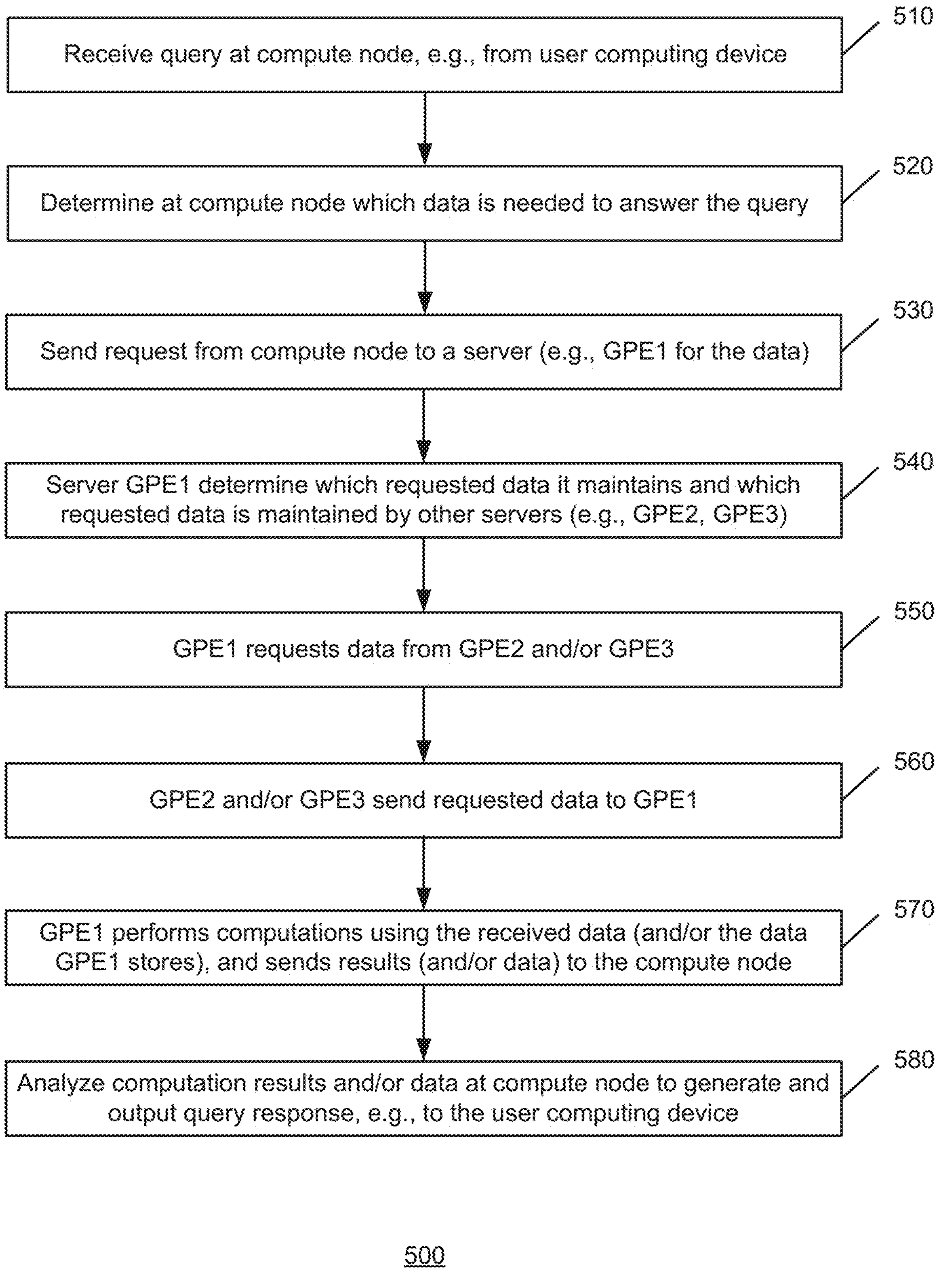
FIG. 5 is an operational flow of an implementation of a method for query processing in a compute pushdown OLTP mode.

FIG. 5 is an operational flow of an implementation of a method 500 for query processing in a compute pushdown OLTP mode. The method may be performed in the environment 100 and/or by the system 400 in some implementations.

At 510, a query (e.g., the query 175) is received at the compute node 210 (e.g., the query processing engine 110). The query may be received from a user computing device, such as the user computing device 130.

At 520, based on the received query 175, the compute node 210 determines which data is needed to answer the query 175.

At 530, the compute node 210 sends a request to one of the servers (e.g., GPE1 server 220) for the data.

At 540, the server 220 determines which of the data it has in its storage, and which of the data is maintained by the other servers 230, 240.

At 550, the server 220 requests the data from the other servers 230, 240 that is maintained by the other servers 230, 240.

At 560, the other servers 230, 240 send the requested data to the server 220.

At 570, the server 220 performs computations on the data it has received from the servers 230, 240 along with the data of the distributed graph that the server 220 maintains (e.g., in its storage), and sends the results of the computations, and any additional data (if any) needed for subsequent computations at the compute node 210, to the compute node 210

At 580, the compute node 210 analyzes the results of the computations and/or data received from the server 220 and generates and outputs a response to the query (e.g., the query response 195). The query response 195 may be provided to a user computing device, such as the user computing device 130.

Figure 6:
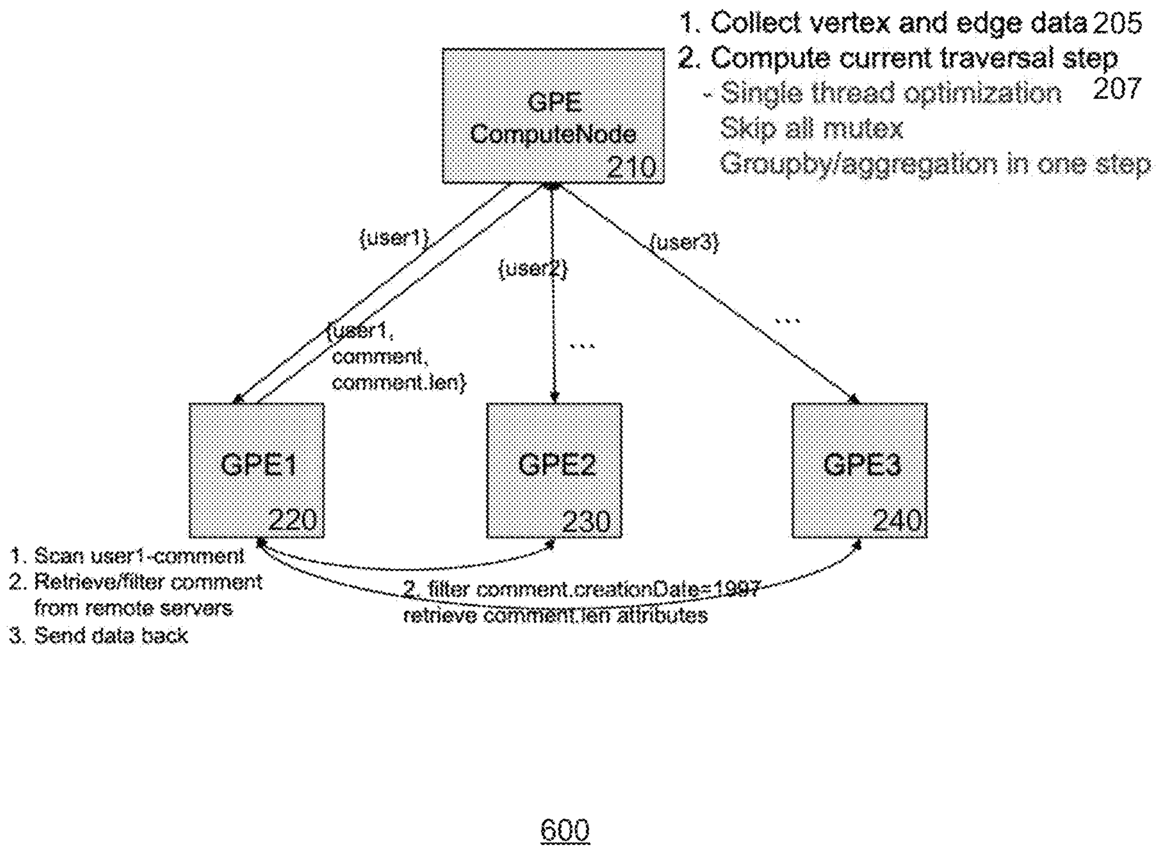
FIG. 6 is a diagram of a system useful for describing an implementation of query processing in a single thread OLTP mode.

In some implementations, a single thread processing technique may be used for OLTP graph workload under high queries per second (QPS). FIG. 6 is a diagram of a system 600 useful for describing an implementation of query processing in a single thread OLTP mode. There is overhead when multiple threads are used, e.g., because of conflicts. The single thread OLTP mode is an optimization in which a single thread mode is leveraged. It can be used individually as an optimization or in conjunction with the compute pushdown OLTP mode optimization described with respect to FIGS. 4 and 5.

The system 600 is similar to the system 200 of FIG. 2 as it comprises a plurality of servers 220, 230, 240 (GPE1 220, GPE2 230, GPE3 240, respectively) and a compute node 210 (GPE ComputeNode). These components are similarly numbered to those in the system 200 of FIG. 2 and their descriptions are omitted for brevity.

In the single thread OLTP mode, there is only a single thread processing the current query (e.g., the query 175) to avoid conflicts among multiple threads. Therefore, all mutex checks are skipped (e.g., a mutex is a lock). Groupby/aggregation is performed in one step, because multiple threads are not used which would otherwise result in each thread (of the multiple threads) computes its local result (a partial result), and at the end all of the local (i.e., partial) results are aggregated/merged together. Therefore, the single thread OLTP mode uses less computing power and is faster. There is no need to merge any data with the single thread technique. Because each query incurs minimum CPU overhead, more QPS can be supported.

In some implementations, an automatic (e.g., dynamic) transition can be made to single thread mode from multiple thread mode when processing an OLTP query. This transition may be dependent on the complexity of the query for example.

Figure 7:
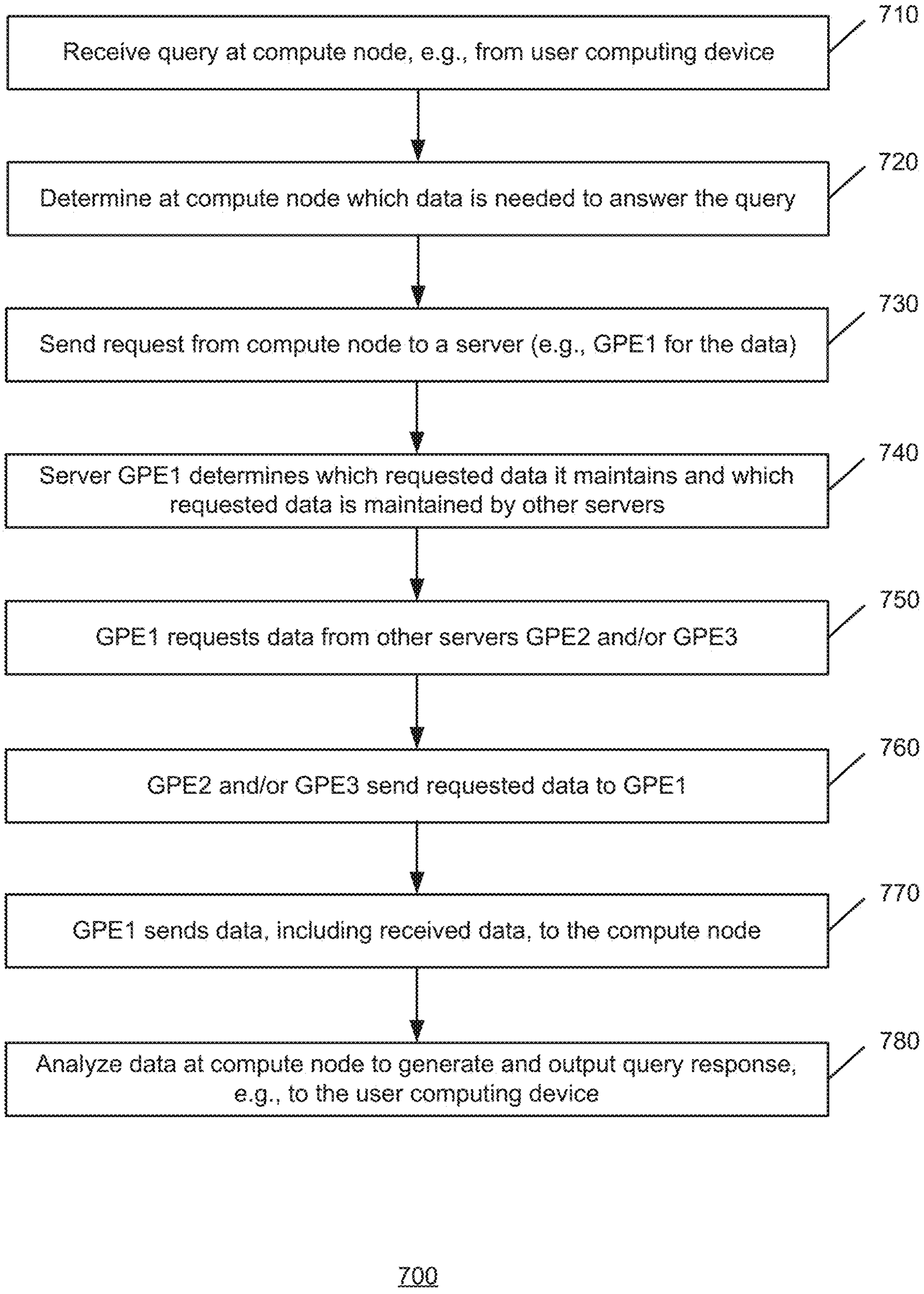
FIG. 7 is an operational flow of an implementation of a method for query processing in a single thread OLTP mode.

FIG. 7 is an operational flow of an implementation of a method 700 for query processing in a single thread OLTP mode. The method 700 may be performed in the environment 100 and/or by the system 600 in some implementations.

At 710, a query (e.g., the query 175) is received at the compute node 210 (e.g., the query processing engine 110). The query may be received from a user computing device, such as the user computing device 130.

At 720, based on the received query 175, the compute node 210 determines which data is needed to answer the query 175. It is noted that, in some implementations, this operation and the operations of the method 700 are performed with a single thread, not with multiple threads, and all mutexs are skipped or otherwise avoided or prevented, and groupby/aggregation occurs in one step.

At 730, the compute node 210 sends a request to one of the servers (e.g., GPE1 server 220) for the data.

At 740, the server 220 determines which of the data it has in its storage, and which of the data is maintained by the other servers 230, 240.

At 750, the server 220 requests the data from the other servers 230, 240 that is maintained by the other servers 230, 240.

At 760, the other servers 230, 240 send the requested data to the server 220.

At 770, the server 220 sends the gathered data to the compute node 210 for computation of the response to the query 175.

At 780, the compute node 210 analyzes the data received from the server 220 and generates and outputs a response to the query (e.g., the query response 195). The query response 195 may be provided to a user computing device, such as the user computing device 130. In some implementations, only the computation part for the compute node (780) is running in a single thread mode. Server to server communications between Compute Node/GPE nodes are in multiple threads and in parallel. The reason is that only the computation part involves locks, and two step computation for aggregation etc.

Figure 8:
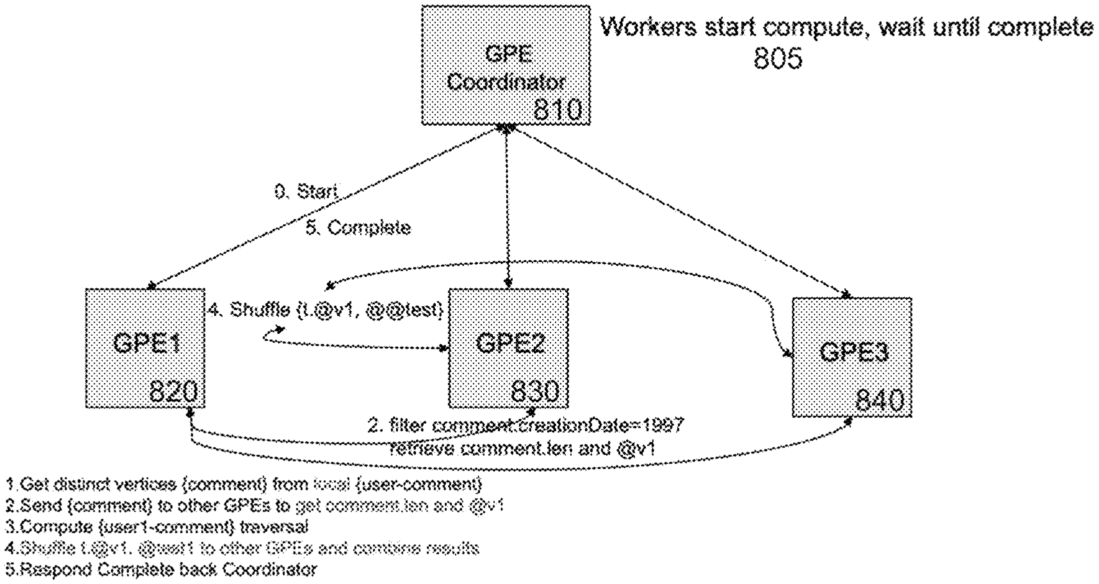
FIG. 8 is a diagram of a system useful for describing an implementation of query processing in a distributed OLAP mode.

It is noted that the above modes are for OLTP query processing and are not well suited for OLAP query processing. A distributed OLAP mode is therefore provided. FIG. 8 is a diagram of a system 800 for describing an implementation of query processing in a distributed OLAP mode.

The system 800 comprises a plurality of servers 820, 830, 840 (GPE1 820, GPE2 820, GPE3 830, respectively) and a coordinator node 810 (GPE Coordinator). In some implementations, the coordinator node 810 is resident or integral with one of the plurality of servers 820, 830, 840. The system 800 illustrates the coordinator node 810 separate from the servers 820, 830, 840 for ease of description, though it is contemplated that the coordinator node 810 may be comprised within one of the servers 820, 830, 840. As an example, the servers 820, 830, 840 may correspond to the servers 120*a*, 120*b*, 120*c*, respectively, of FIG. 1, and the coordinator node 810 may correspond to the OLAP processing engine 114 of the query processing engine 110 of FIG. 1, in some implementations. The coordinator node 810 is configured to pull and receive data from the servers 820, 830, 840 and perform the computation used to answer and respond to the query (e.g., the query 175). The coordinator node 810 initiates that workers (the servers 820, 830, 840) start computing and waits until complete 805.

The distributed OLAP mode is a different processing mode than the OLTP mode. It is a query across all data. Data is pulled from other servers (e.g., to GPE1 from GPE2 and GPE3).

An example query is provided below and is used to describe aspects and features of this mode. Note this example query is a slightly different query than that set forth above with the OLTP examples. This query starts with all vertices and needs to read the prior accumulator results. Recall each server only has their local nodes and address but not the target nodes because the target nodes are stored on other servers. In an implementation, a batch lookup is performed (e.g., from GPE1 do a batch lookup to GPE2 and GPE3). This is a single network communication that gets all the results back to GPE1 from GPE3 (and GPE2). This is performed by traversing the address twice. For the first step, look at the distinct comments on GPE1 and perform any local filtering; then send the distinct comments from GPE1 to the server that holds that data (e.g., GPE2 and/or GPE3) and then on those servers, the comments will be retrieved that satisfy the conditions and then the results are sent back to GPE1. Now the query is formally processed. This way, sending one request at a time is avoided.

An example query is provided:

```
create query test1( ) for graph ldbc_snb{
  GroupByAccum<VERTEX<Comment>, SumAccum<INT>> @@test1;
  SumAccum<INT> @v1;
  Start = {users.*};
  Result = select t
    from Start:s - (Creates) - Comment:
    where t.creationDate == 1997
    accum t@v1 += t.@v1 * t.len, @@test1 += (t -> 1)
}
```

In this mode, there is no single compute node because the data may be too big for a single server to handle. Instead, the coordinator node 810 (GPE coordinator) is coordinates the query processing computation(s) on multiple GPE servers 820, 830, 840. Each of the servers 820, 830, 840 performs its local computation. In the running example:

1. Each server (GPE) starts with the user vertices stored locally (i.e., stored in the storage of the server). The server then pre-scans user-comment edges and gets all distinct {comment} vertices.

2. The server sends remote topology queries on {comment} vertices to other nodes, to filter (comment.creationDate=1997) and retrieve {comment}'s len attribute and @v1 accumulator.

3. The server now has all the information to process the current edge traversal step.

4. All participating servers (GPEs) shuffle their {t.@v1, @@test} intermediate results, and combine them. Note that local accumulator is partitioned based on vertex (same as how vertex is partitioned), while global accumulator uses a hash partition scheme.

5. Respond Complete back to the coordinator node 810 such that coordinator node 810 can move to process the next query block.

Note the coordinator node 810 (the GPE coordinator) instructs each GPE server (e.g., the servers 820, 830, 840) to process the initial query step and each server will compute the data stored locally to them. Therefore, all the data is not pushed back to the coordinator node 810. The coordinator node 810 initiates the processing and receives the process complete responses from the servers 820, 830, 840.

Figure 9:
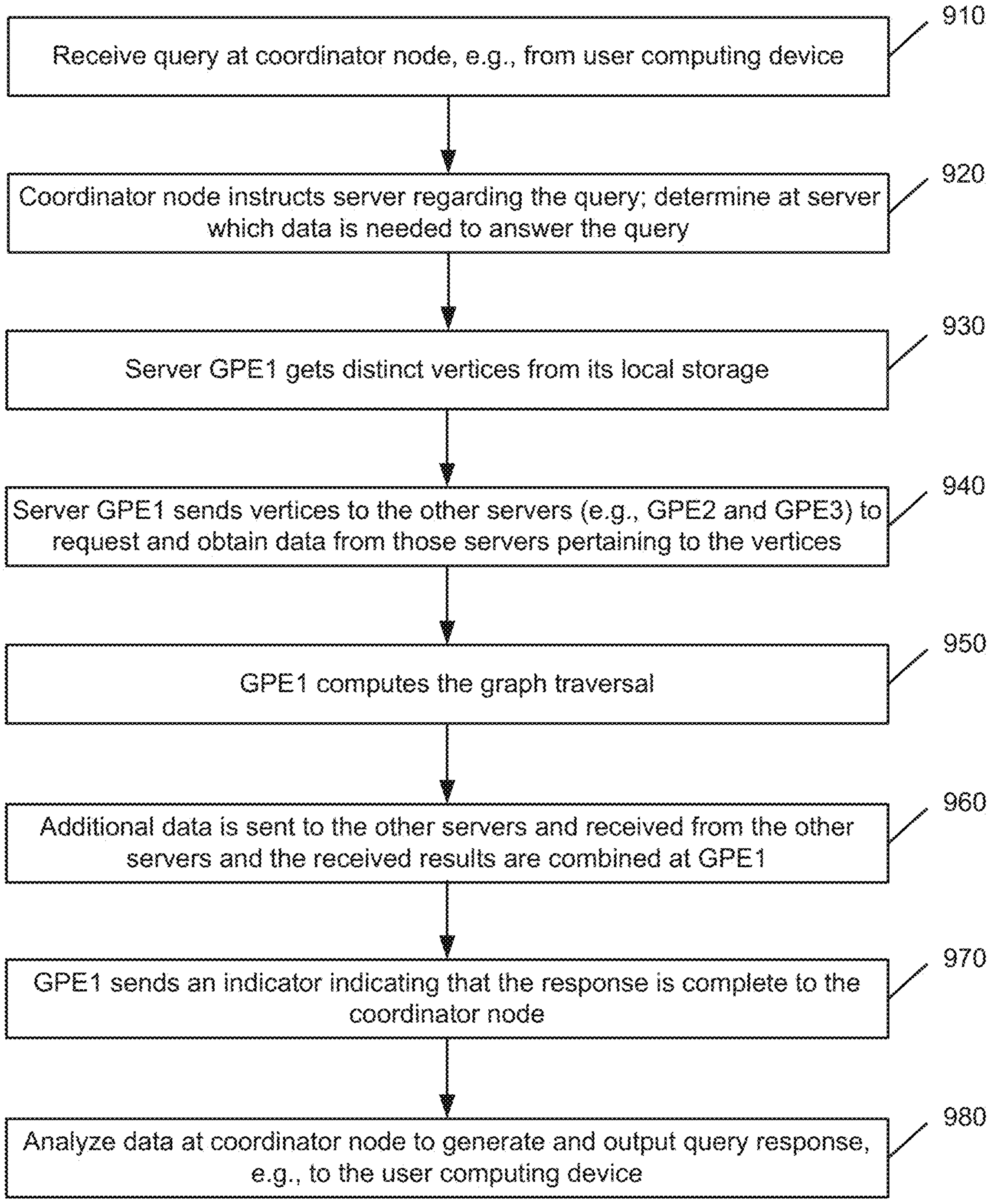
FIG. 9 is an operational flow of an implementation of a method for query processing in a distributed OLAP mode.

FIG. 9 is an operational flow of an implementation of a method 900 for query processing in a distributed OLAP mode. The method 900 may be performed in the environment 100 and/or by the system 800 in some implementations.

At 910, a query (e.g., the query 175) is received at the coordinator node 810 (e.g., the query processing engine 110). The query may be received from a user computing device, such as the user computing device 130.

At 920, the coordinator node 810 instructs a server (e.g., the server 820 also referred to as GPE1) regarding the query. Based on the received query 175, the server 820 determines which data is needed to answer the query 175.

At 930, the server 820 gets distinct vertices (comments) from its local storage of user comments.

At 940, the server 820 sends the comments to the other servers (e.g., the servers 830 (GPE2) and 840 (GPE3)) to get data from those servers pertaining to the comments.

At 950, the server 820 computes the graph traversal.

At 960, additional data is sent to the other servers and received from the other servers and the received results are combined at GPE1.

At 970, an indicator that indicates that the response is complete is sent to the coordinator node 810 from the server 820.

At 980, the coordinator node 810 analyzes the data received from the server 820, and generates and outputs a response to the query (e.g., the query response 195). The query response 195 may be provided to a user computing device, such as the user computing device 130.

Figure 10:
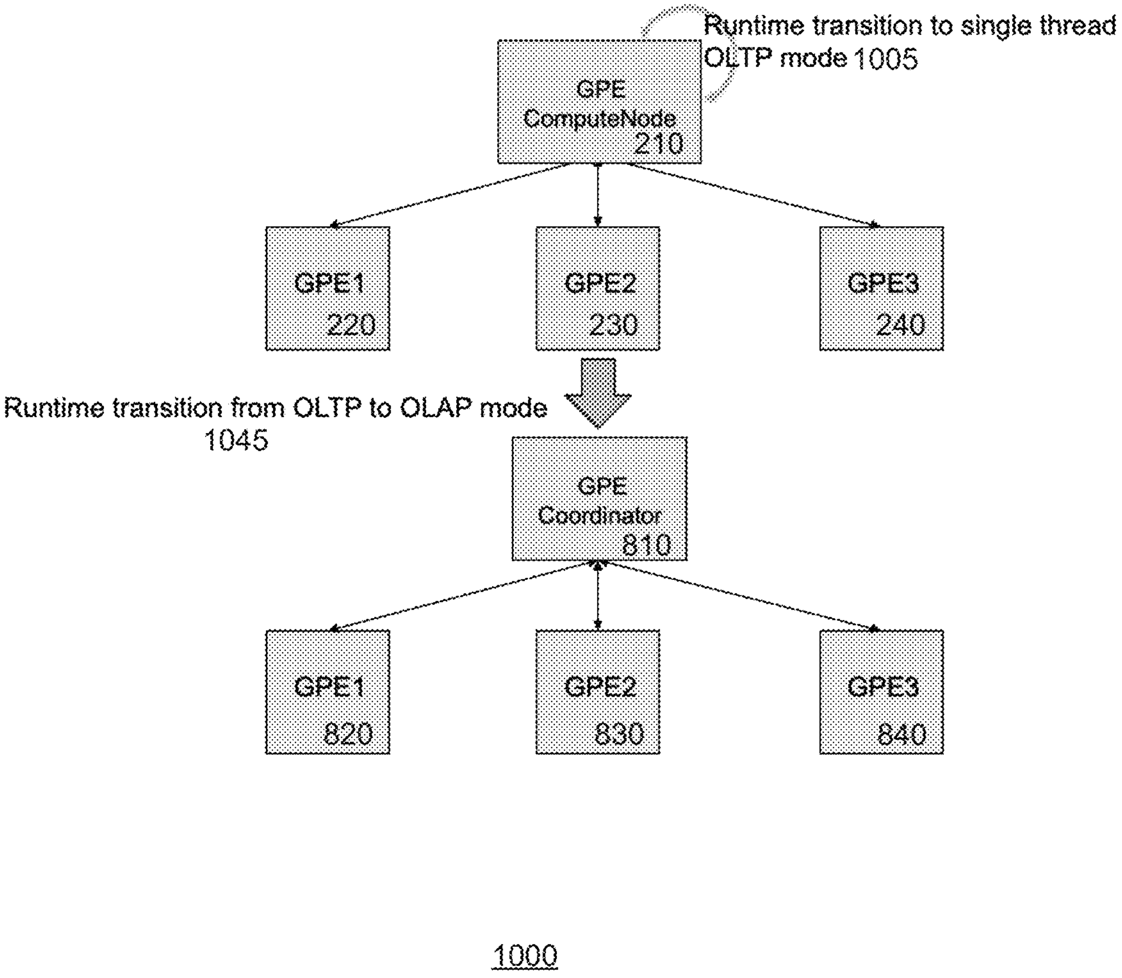
FIG. 10 is a diagram of a system useful for describing an implementation of query processing with automatic transition between OLTP and OLAP modes.

It is contemplated that some queries sometimes are better treated as OLAP queries and other times are better treated as OLTP queries. FIG. 10 is a diagram of a system 1000 useful for describing an implementation of query processing with automatic transition between OLTP and OLAP modes.

The system 1000 comprises an OLTP query processing mode that is similar to the system 200 of FIG. 2 as it comprises a plurality of servers 220, 230, 240 (GPE1 220, GPE2 230, GPE3 240, respectively) and a compute node 210 (GPE ComputeNode). These components are similarly numbered to those in the system 200 of FIG. 2 and their descriptions are omitted for brevity. The OLTP query processing mode may perform a runtime transition to single thread OLTP mode 1005, in some implementations.

The system 1000 further comprises an OLAP query processing mode that is similar to the system 800 of FIG. 8 as it comprises a plurality of servers 820, 830, 840 (GPE1 820, GPE2 830, GPE3 840, respectively) and a coordinator node 810 (GPE Coordinator). These components are similarly numbered to those in the system 800 of FIG. 8 and their descriptions are omitted for brevity.

A runtime transition from OLTP mode to OLAP mode 1045 for query processing may occur as described further herein. In some implementations, the transition determination engine 118 of the query processing engine 110 of FIG. 1 may be configured to determine when to transition between OLTP mode and OLAP mode and to initiate the transition. The switch between OLTP query processing mode and OLAP query processing mode may be dynamic and based on factors such as the particular query and/or the system load.

While some queries are easy to decide whether they are OLTP queries or OLAP queries, some queries are harder to determine which query processing mode, OLTP mode or OLAP mode, is better to use to generate a response query and a decision may be made based on the actual input parameters. A query optimizer can be used to predict the data size. However, such a prediction could be wrong. Herein an adaptive technique is described to transition between different query modes (OLTP and OLAP) on the fly (i.e., dynamically), based on e.g., an estimation of data statistics based on the query.

An example of generated code for the query is provided, for both query plans:

```
Mode = OLTP;
Main control flow {
  for each traversal;
    ComputeNode check( )
    if mode == OLTP; run ComputeNode flow;
    else run Cooordinator/Worker flow;
```

-continued

```
    }
    ComputeNode_check {
        if intermediate results size > threshold;
        mode = OLAP;
        ship intermediate results to related GPEs;
    }
```

Figure 11:
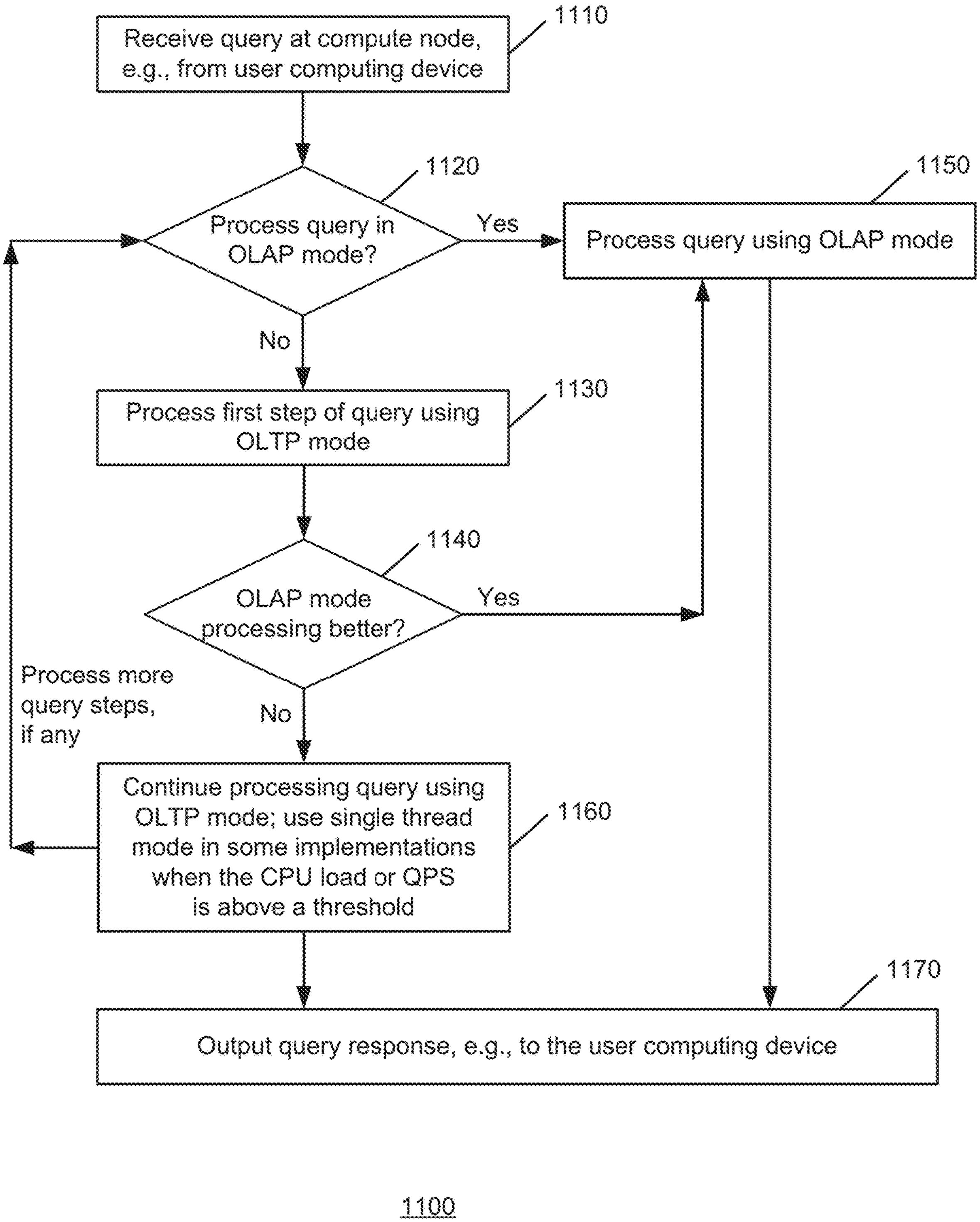
FIG. 11 is an operational flow of an implementation of a method for query processing with automatic transition between OLTP and OLAP modes.

FIG. 11 is an operational flow of an implementation of a method 1100 for query processing with automatic transition between OLTP and OLAP modes. The method 1100 may be performed in the environment 100 and/or by the system 1000 in some implementations.

At 1110, a query (e.g., the query 175) is received at the coordinator node 810 (e.g., the query processing engine 110). The query may be received from a user computing device, such as the user computing device 130.

At 1120, it is determined whether to process the query in OLAP mode, using predetermined criteria. If so, then processing continues at 1150 with OLAP mode; otherwise, continue at 1130 with OLTP mode. For example, when the query hits all vertices, then proceed with OLAP mode at 1150.

At 1130, proceed with OLTP mode (e.g., when the query starts with few vertices), where the first step of the query is processed with OLTP mode processing.

At 1140, determine whether OLAP mode processing would be better (e.g., when there are a lot of results (millions of nodes need to be processed; over a threshold, etc.)) and if so, then transition to OLAP mode (e.g., the GPE compute node becomes the GPE coordinator) and continue processing the query at 1150 in OLAP mode. In an implementation, when at 1140 the compute node determines the amount of data is greater than a predetermined threshold, then processing transitions to OLAP mode and the compute node will ship intermediate results to other participating GPEs and become a coordinator. Otherwise, processing continues at 1160 in OLTP mode. In some implementations, processing continues at 1120 when there are more query steps.

At 1170, regardless of the mode used to process the query, a query response 195 may be provided to a user computing device, such as the user computing device 130.

In an implementation, when the CPU load is greater than 80 percent or when the QPS is too high (e.g., the request wait queue is long as compared to a threshold like 80 percent, then the system is overloaded and so it is too high), the compute node will enter single thread mode which will skip all mutex and perform single level aggregation.

FIG. 12 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 12, an exemplary system for implementing aspects described herein includes a computing device, such as computing device 1200. In its most basic configuration, computing device 1200 typically includes at least one processing unit 1202 and memory 1204. Depending on the exact configuration and type of computing device, memory 1204 may be volatile (such as random access memory (RAM)), non-volatile (such as read-only memory (ROM), flash memory, etc.), or some combination of the two. This most basic configuration is illustrated in FIG. 12 by dashed line 1206.

Computing device 1200 may have additional features/functionality. For example, computing device 1200 may include additional storage (removable and/or non-removable) including, but not limited to, magnetic or optical disks or tape. Such additional storage is illustrated in FIG. 12 by removable storage 1208 and non-removable storage 1210.

Computing device 1200 typically includes a variety of computer readable media. Computer readable media can be any available media that can be accessed by the device 1200 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1204, removable storage 1208, and non-removable storage 1210 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media may be part of computing device 1200.

Computing device 1200 may contain communication connection(s) 1212 that allow the device to communicate with other devices. Computing device 1200 may also have input device(s) 1214 such as a keyboard, mouse, pen, voice input device, touch input device, etc. Output device(s) 1216 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a method comprises: sending a request to a first server from a compute node for data to respond to a query; receiving the data at the compute node from the first server, wherein the data comprises first data stored at the first server and second data stored at a second server; analyzing the data at the compute node to generate a query response to the query; and outputting the query response.

Implementations may include some or all of the following features. The method further comprises receiving the query at the compute node. The query is received at the compute node from a user computing device. The query response is outputted to the user computing device. The first server comprises the compute node. The data further comprises third data stored at a third server. The method further comprises determining at the compute node the data needed to answer the query and sending the request for the data to the first server. The first server is configured to determine that the first data is stored at the first server and that the second data is stored at the second server, and send a request for the second data to the second server and receive the second data from the second server. The first server is further configured to send the first data and the second data to the compute node. The first server and the second server each comprise a respective graph processing engine (GPE). The method further comprises performing online transactional processing (OLTP) on the query using a query processing engine. The OLTP comprises compute pushdown OLTP. The method further comprises receiving a computation result for the query at the compute node from the first server. The OLTP comprises single thread OLTP.

In an implementation, a method comprises: sending a request to a first server from a coordinator for a response to a query received at the coordinator; receiving the response at the coordinator from the first server, wherein the response is based on first data stored at the first server and second data stored at a second server; analyzing the response at the compute node to generate a query response to the query; and outputting the query response.

Implementations may include some or all of the following features. The first server comprises the coordinator, and the response is further based on third data stored at a third server, and wherein each servers comprises a respective graph processing engine (GPE). The method further comprises performing online analytical processing (OLAP) on the query using a query processing engine.

In an implementation, a system comprises: a query processing engine configured to perform online transactional processing (OLTP) and online analytical processing (OLAP) on a query; and a transition determination engine configured to determine when to use OLTP processing on the query and when to use OLAP processing on the query.

Implementations may include some or all of the following features. The system further comprises an OLTP processing engine configured to perform the OLTP processing on a query using a distributed graph, and an OLAP processing engine configured to perform the OLAP processing on the query using the distributed graph. The system further comprises a server that comprises the query processing engine and a storage that stores a portion of the data of the distributed graph.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:

receiving a query at a compute node, wherein the compute node is a coordinator;

determining an estimate of data involved in responding to the query;

sending a request to a single distributed graph database cluster comprising a plurality of servers from the coordinator for edge and vertex data to respond to the query, wherein each of the servers is in communication with each other and each of the servers knows where data resides on all of the servers, wherein each of the servers requests data from the other servers for query optimization;

receiving the edge and vertex data in parallel at the compute node from the plurality of servers to optimize the query;

determining when to process the query using an online transactional processing (OLTP) mode and when to process the query using an online analytical processing (OLAP) mode in response to the estimate of data involved in responding to the query, wherein both the OLTP mode and the OLAP mode use the same single distributed graph database cluster;

analyzing the edge and vertex data from the plurality of servers at the coordinator to generate a query response to the query, wherein the analyzing comprises:

performing processing on the query using the OLTP mode using the edge and vertex data and a query plan optimized for the OLTP mode in response to determining to process the query using the OLTP mode; and performing processing on the query using the OLAP mode using the edge and vertex data and a query plan optimized for the OLAP mode in response to determining to process the query using the OLAP mode; and during runtime, dynamically determining when to switch processing of the query between the OLTP mode and the OLAP mode based on at least one of an estimation of data statistics based on the query or a system load, and responsive to the dynamic determination, switching processing of the query between the OLTP mode and the OLAP mode on the fly; and outputting the query response.

2. The method of claim 1, wherein the query is received at the coordinator from a user computing device.

3. The method of claim 1, wherein the query response is outputted to the user computing device.

4. The method of claim 1, wherein the coordinator is comprised within one of the plurality of servers.

5. The method of claim 1, further comprising determining at the coordinator the data needed to answer the query and sending the request for the data to the plurality of servers.

6. The method of claim 1, wherein the plurality of servers are configured to communicate among each other to at least one of fetch graph data or filter graph data.

7. The method of claim 6, wherein the plurality of servers are configured to communicate among each other to at least one of fetch graph data or filter graph data when edge traversal is involved.

8. The method of claim 1, wherein each of the plurality of servers comprises a respective graph processing engine (GPE).

9. The method of claim 1, wherein the OLTP comprises compute pushdown OLTP.

10. The method of claim 9, further comprising receiving a computation result for the query at the coordinator from at least one of the plurality of servers, wherein the computation result comprises aggregated data from the plurality of servers.

11. The method of claim 1, wherein the OLTP comprises single thread OLTP in the coordinator to combine results from the plurality of servers by skipping all mutex and minimizing intermediate storage for aggregations.

12. A method comprising:

sending a request to a single distributed graph database cluster comprising a plurality of servers to perform each a vertex traversal or an edge traversal in parallel, from a coordinator for a response to a query received at the coordinator, wherein each of the plurality of servers is in communication with each other and each of the servers knows where data resides on all of the servers, wherein each of the servers requests data from the other servers for query optimization;

receiving the response at the coordinator from the plurality of servers to optimize the query;

analyzing the response at the coordinator to generate a query response to the query, wherein the analyzing comprises:

determining when to process the query using an online transactional processing (OLTP) mode and when to process the query using an online analytical processing (OLAP) mode in response to an estimate of data involved in responding to the query, wherein both the OLTP mode and the OLAP mode use the same single distributed graph database cluster;

performing processing on the query using the OLTP mode using the single distributed graph database cluster and a query plan optimized for the OLTP mode in response to determining to process the query using the OLTP mode; and performing processing on the query using the OLAP mode using the single distributed graph database cluster and a query plan optimized for the OLAP mode in response to determining to process the query using the OLAP mode; and during runtime, dynamically determining when to switch processing of the query between the OLTP mode and the OLAP mode based on at least one of an estimation of data statistics based on the query or a system load, and responsive to the dynamic determination, switching processing of the query between the OLTP mode and the OLAP mode on the fly; and outputting the query response.

13. The method of claim 12, wherein each of the plurality of servers comprises a respective graph processing engine (GPE), and wherein the edge traversal on target vertices are optimized by traversing the edges a first time to get distinct target vertices from local storage and a second time to compute a graph traversal.

14. The method of claim 12, further comprising performing online analytical processing (OLAP) on the query using a query processing engine, and wherein the plurality of servers communicate intermediate results among each other and get final results to send to the coordinator.

15. The method of claim 13, wherein traversing the edges the first time comprises identifying the target vertices and sending the identities of the target vertices to a corresponding compute node where filtering is applied and data is retrieved, and wherein traversing the edges the second time comprises computing a full edge traversal with fetched target vertex data and computation results.

16. A system comprising:

at least one processor; and a non-transitory computer readable medium comprising instructions that, when executed by the at least one processor, cause the system to:

receive a query;

determine an estimate of data involved in responding to the query;

determine when to process the query using an online transactional processing (OLTP) mode and when to process the query using an online analytical processing (OLAP) mode in response to the estimate of data involved in responding to the query, wherein both the OLTP mode and the OLAP mode use the same data store, wherein the data store is a single distributed graph database cluster comprising a plurality of servers, wherein each of the plurality of servers is in communication with each other;

perform processing on the query using the OLTP mode using the data store and a query plan optimized for the OLTP mode in response to determining to process the query using the OLTP mode;

perform processing on the query using the OLAP mode using the data store and a query plan optimized for the OLAP mode in response to determining to process the query using the OLAP mode; and during runtime, dynamically determine when to switch processing of the query between the OLTP mode and the OLAP mode based on at least one of an estimation of data statistics based on the query or a system load, and responsive to the dynamic determination, switch processing of the query between the OLTP mode and the OLAP mode on the fly.

17. The system of claim 16, wherein the computer readable medium further comprises instructions, that when executed by the at least one processor, cause the system to perform the OLTP processing on the query using a distributed graph, and to perform the OLAP processing on the query using the distributed graph.

18. The system of claim 17, further comprising a server that comprises at least one processor and a storage that stores a portion of the data of the distributed graph.

19. The system of claim 16, wherein the computer readable medium further comprises instructions, that when executed by the at least one processor, cause the system to first run in the OLTP mode by fetching data from the plurality of servers and do local computations, and when the data retrieved from the plurality of servers exceeds a threshold, transition to the OLAP mode until the query finishes.

* * * * *